United States Patent
Nelson, Jr.

(10) Patent No.: US 12,535,041 B2
(45) Date of Patent: Jan. 27, 2026

(54) SYSTEMS AND METHODS FOR AT-CYLINDER FUEL SWITCHING

(71) Applicant: CATERPILLAR INC., Peoria, IL (US)

(72) Inventor: Bryan Edward Nelson, Jr., Chillicothe, IL (US)

(73) Assignee: CATERPILLAR INC., Peoria, IL (US)

( * ) Notice: Subject to any disclaimer, the term of this patent is extended or adjusted under 35 U.S.C. 154(b) by 236 days.

(21) Appl. No.: 18/524,868

(22) Filed: Nov. 30, 2023

(65) Prior Publication Data

US 2025/0179970 A1 Jun. 5, 2025

(51) Int. Cl.
*F02D 41/40* (2006.01)
*F02D 19/06* (2006.01)
*F02D 41/38* (2006.01)

(52) U.S. Cl.
CPC ......... *F02D 41/403* (2013.01); *F02D 19/061* (2013.01); *F02D 41/3845* (2013.01); *F02D 2041/389* (2013.01)

(58) Field of Classification Search
CPC .. F02D 41/403; F02D 19/061; F02D 41/3845; F02D 2041/389; F02D 19/0607; F02D 19/0689; F02D 19/0647; F02D 19/105; F02D 19/0649; F02D 19/0652; F02D 19/081; F02D 41/0025; F02D 19/0665; F02D 41/40; F02D 41/406; F02D 2200/0611; F02D 19/0621; F02D 19/0676; F02D 19/0681; F02D 19/0684; F02D 19/0694; F02D 19/0655; Y02T 10/30; F02M 37/0064; F02M 63/0007; F02M 63/0045; F02M 63/0054; F02M 43/04

See application file for complete search history.

(56) References Cited

U.S. PATENT DOCUMENTS

| | | | |
|---|---|---|---|
| 4,782,794 A | 11/1988 | Hsu | |
| 4,864,990 A | 9/1989 | Tateishi | |
| 4,911,127 A * | 3/1990 | Perr | F02M 61/205 123/446 |
| 5,390,856 A * | 2/1995 | Bickerton | F02M 43/04 239/533.5 |
| 5,996,558 A | 12/1999 | Ouellette | |
| 6,073,862 A | 6/2000 | Touchette | |
| 6,371,151 B1 * | 4/2002 | Saylor | F02M 37/007 137/565.29 |
| 10,753,274 B2 * | 8/2020 | Magnusson | F02D 41/0025 |
| 11,047,297 B2 * | 6/2021 | Harknett | F02B 69/04 |
| 11,384,721 B1 * | 7/2022 | Schroeder | F02D 19/0655 |

(Continued)

FOREIGN PATENT DOCUMENTS

| | | |
|---|---|---|
| CN | 206386192 U | 8/2017 |
| CN | 211397728 U | 9/2020 |

(Continued)

*Primary Examiner* — Kurt Philip Liethen
(74) *Attorney, Agent, or Firm* — Lee & Hayes, PLLC (57) ABSTRACT

An internal combustion engine system is described herein. The systems described herein allow for switching from the methanol to the diesel as a primary fuel at the cylinder rather than at the system. A valve at an inlet of a primary return tank is used to isolate a primary return tank of a primary fuel. A primary fuel pump is deenergized allowing an input valve to open. Pilot fuel is then directed into both a primary fuel input line and a pilot fuel input line into the injector.

20 Claims, 7 Drawing Sheets

(56) References Cited

U.S. PATENT DOCUMENTS

| | | | |
|---|---|---|---|
| 11,585,303 B2* | 2/2023 | Wloka | F02D 19/0692 |
| 12,404,818 B2* | 9/2025 | Munshi | F02D 41/401 |
| 2012/0325180 A1* | 12/2012 | Montgomery | F02D 19/0694 |
| | | | 123/299 |
| 2015/0013638 A1* | 1/2015 | Ishida | F02D 41/0025 |
| | | | 123/299 |
| 2016/0146123 A1* | 5/2016 | Seo | F02D 19/0628 |
| | | | 123/478 |
| 2016/0237921 A1* | 8/2016 | Mumford | F02D 19/0605 |
| 2018/0347456 A1* | 12/2018 | Magnusson | F02D 41/003 |
| 2021/0277834 A1* | 9/2021 | Culwick | F02C 7/222 |
| 2025/0084800 A1* | 3/2025 | Gerstner | F02D 19/0613 |

FOREIGN PATENT DOCUMENTS

| | | |
|---|---|---|
| CN | 113047996 A | 6/2021 |
| DE | 102012012450 A1 | 12/2012 |
| JP | 6262076 B2 | 1/2018 |
| WO | 2010064302 A1 | 6/2010 |

\* cited by examiner

SYSTEMS AND METHODS FOR AT-CYLINDER FUEL SWITCHING

TECHNICAL FIELD

The present disclosure relates generally to operating a prime mover, and more particularly, to switching from one fuel as a primary fuel to another fuel as the primary fuel.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. Further, in pilot-ignited applications, including dual fuel applications, a mixture of a gaseous fuel, such as natural gas and air, is delivered into a cylinder and ignition is triggered using a relatively small direct injection of a compression ignition fuel (e.g., pilot fuel), which autoignites to trigger ignition of the relatively larger main charge.

As part of the effort to improve the efficiency of these engines, researchers have explored various types of alternate fuel mixtures, including alcohol fuels like methanol, ethanol, and various other fuels. In some examples, methanol is directly injected into an engine cylinder and the methanol is ignited with a pilot fuel or a spark. The use of methanol can provide various benefits over other alternative fuels. For example, methanol has relatively low production costs and can be less expensive to produce relative to other alternative fuels. Further, the availability of methanol can be greater than other sources of alternate fuels because methanol can be produced in a variety of ways using materials ranging from natural gas to coal. As mentioned above, a pilot fuel may be needed to assist in the ignition of the methanol. Diesel fuel is often used as the pilot fuel to ignite the low cetane methanol fuel for methanol powered engines. Typically, diesel fuel, as the pilot fuel, will be injected into a combustion chamber prior to the injection of the methanol fuel. The ignition of the diesel (or pilot fuel) causes the ignition of the methanol fuel.

In some instances, the use of both diesel and methanol in an engine may be desirable. Some efforts have been made to provide methanol and/or diesel in varying amount based on the condition of the engine (i.e., startup) or the power level. For example, China Patent Application No. CN201621424210U to Hu YongJun ("the '210 application") describes a system configured to switch between two different types of fuel. The system of the '210 application uses a "dual fuel rail multi-way valve" to allow a user to switch fuel consumed by the engine from one fuel to another. The valve is described as a shell and a spool piston valve, whereby in one position one fuel is provided to the engine, and in the other position, the other fuel is provided to the engine. However, the system described in the '210 application has some deficiencies. For example, although the valve allows a user to switch from one type of fuel to the other, the changeover takes time as the fuel being switch from flows through the system and into the combustion chamber. If the fuel system has a relatively substantial volume, there may be a significant time lag between when the valve position switches and when the desired fuel is finally introduced into the combustion chamber.

Examples of the present disclosure are directed to overcoming deficiencies of such systems

SUMMARY

In an aspect of the presently disclosed subject matter, a system includes an internal combustion engine that combusts a primary fuel and a pilot fuel, wherein the engine comprises an injector in a cylinder of the engine, the injector configured to inject the pilot fuel and the primary fuel for combustion, a primary fuel pump fluidically connectable to and disconnectable from a primary fuel feed to supply the primary fuel to the injector through a primary fuel input line, a pilot fuel pump fluidically connected to a pilot fuel feed to supply the pilot fuel to the injector through a pilot fuel input line, a primary return isolation valve for fluidically disconnecting a primary fuel excess line from a primary return tank in a first position of the primary return isolation valve and fluidically connecting the primary fuel excess line in a second position of the primary return isolation valve, a primary outlet valve for fluidically connecting the primary fuel to the primary fuel input line when the primary outlet valve is in a first position of the primary outlet valve and fluidically disconnecting the primary fuel from the primary fuel input line when the primary outlet valve is in a second position of the primary outlet valve, and an input bypass line for providing a portion of the pilot fuel from the pilot fuel pump into the primary fuel input line when the primary outlet valve is in the second position of the primary outlet valve.

In another aspect of the presently disclosed subject matter, an injector system includes an injector comprising a pilot fuel inlet for receiving a pilot fuel from a pilot fuel pump through a pilot fuel input line from a pilot fuel pump fluidically connected to a pilot fuel feed, a pilot fuel outlet for removing an excess of the pilot fuel into a pilot return tank, a primary fuel inlet for receiving a fuel through a primary fuel input line, wherein the fuel comprises, a primary fuel from a primary fuel pump when a primary outlet valve fluidically connecting a primary fuel pump to the primary fuel input line is open, and, when an input valve of an input bypass line for providing a portion of the pilot fuel from a pilot fuel pump into the primary fuel input line is closed, or a pilot fuel from the pilot fuel pump when the primary outlet valve is closed, and, when the input valve is open, and a primary fuel outlet for removing an excess of the fuel received into the primary fuel input line through a primary fuel excess line.

In a further aspect of the presently disclosed subject matter, a method for at-cylinder switching between methanol to diesel as a primary fuel includes providing a primary fuel from a primary fuel pump into a primary fuel input line through a primary fuel input valve when the primary fuel input valve is in a first position of the primary fuel input valve, providing a pilot fuel from a pilot fuel pump into a pilot fuel input line, deenergizing the primary fuel pump to stop a flow of the primary fuel into the primary fuel input line, positioning the primary fuel input valve in a second position of the primary fuel input valve to direct the flow of the primary fuel to a primary fuel tank, and positioning a bypass valve in a second position of the bypass valve to direct a portion of the pilot fuel from the pilot fuel pump, into an input bypass line, and then into the primary fuel input line.

DETAILED DESCRIPTION

Figure 1:
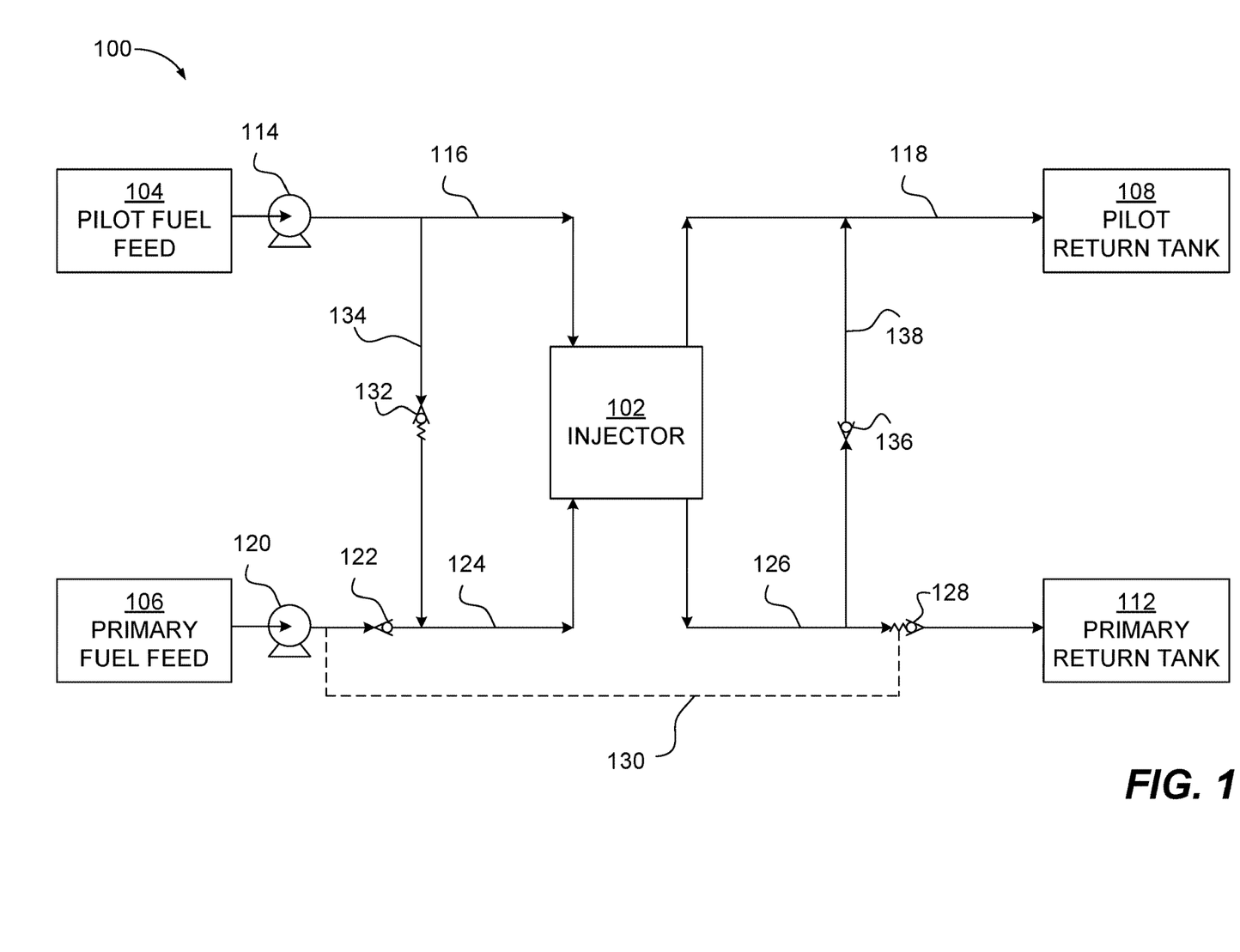
FIG. 1 is schematic of a fuel injector system that uses "at-cylinder" fuel switching, in accordance with one or more examples of the present disclosure.

Wherever possible, the same reference numbers will be used throughout the drawings to refer to same or like parts. Referring to the figures, FIG. 1 is schematic of a fuel injector system 100 that uses "at-injector" fuel switching, in accordance with one or more examples of the present disclosure. As used herein, "at-cylinder" means the fuel entering a cylinder of a combustion engine is switched from one fuel delivery system (e.g., methanol in a methanol fuel rail) to another fuel delivery system (e.g., diesel in a diesel or pilot fuel rail), whereas an "at-system" configuration switches the fuel being delivered to the rail from one fuel to another fuel. For example, in a dual-fuel combustion engine system that uses a methanol fuel rail to deliver methanol to the cylinders, an "at-system" configuration would entail the fuel being provided to the methanol fuel rail switch from methanol to another fuel, such as diesel. The cylinders still receive fuel from the methanol fuel rail, but receive the different fuel, e.g., diesel, being pumped into the methanol fuel rail. In an "at-cylinder" configuration, the switch from one fuel to another occurs at the cylinder by switching the rail delivering the fuel to the cylinders from one fuel rail, such as the methanol fuel rail, to the other fuel rail, such as the diesel or pilot fuel rail. It should be noted that the presently disclosed subject matter does not require the use of fuel rails. Further, the presently disclosed subject matter does not require that all cylinders be configured to switch in an at-cylinder switching configuration. The system 100 is an example of an at-cylinder configuration.

The system 100 includes an injector 102. The injector 102 is used to deliver one or more fuels into a combustion cylinder of a combustion engine (not shown). An example of the injector 102 is illustrated and described in more detail in FIG. 2, below: Returning to FIG. 1, the injector receives a pilot fuel from a pilot fuel feed 104 and a primary fuel from a primary fuel feed 106. In some examples, the pilot fuel is a fuel injected before or in conjunction with the primary fuel. In the example in FIG. 1, compression from a piston (not shown) is used to ignite the pilot fuel, which ignites due to a relatively higher cetane number than other fuels. The relatively higher temperatures created during the ignition and combustion of the pilot fuel then provides a sufficient pressure and temperature to combust the primary fuel, which may not readily compressively ignite. The pilot fuel may include a higher cetane/lower octane liquid fuel, and the primary fuel may include a lower cetane/higher octane liquid fuel. The terms "higher" and "lower" in this context may be understood as relative terms in relation to one another. Thus, the pilot fuel may have a higher cetane number and a lower octane number than a cetane number and an octane number of the primary fuel. The pilot fuel might include a diesel distillate fuel, dimethyl ether, bio-diesel, Hydrotreated Vegetable Oil (HVO), Gas to Liquid (GTL) renewable diesel, any of a variety of liquid fuels with a cetane enhancer, or still another fuel type. The primary fuel may include an alcohol fuel such as methanol or ethanol. Naphtha, for example, or still other fuel types. For the purposes of FIG. 1, the pilot fuel is described as diesel fuel and the primary fuel is described as methanol, though as noted above, the presently disclosed subject matter may be used with other fuel types.

In an operational configuration where the injector 102 receives a pilot fuel through the pilot fuel feed 104, a pilot fuel pump 114 is in fluidic communication with the pilot fuel feed 104. The pilot fuel pump 114 pumps the pilot fuel through pilot fuel input line 116 and into the injector 102 for combustion. Excess pilot fuel exits the injector 102 through a pilot excess line 118 and into a pilot return tank 108. In the same configuration, the injector 102 receives the primary fuel (e.g., methanol) from the primary fuel feed 106. A primary fuel pump 120 is in fluidic communication with the primary fuel feed 106 and pumps the primary fuel through primary outlet valve 122 in a first position (e.g., open), through primary fuel input line 124 and into the injector 102 for combustion. Excess primary fuel exits the injector 102 through a primary fuel excess line 126, through biased check valve 128 and into a primary return tank 112. The biased check valve 128 is a primary return isolation valve that fluidically disconnects the primary return tank 112 from the system 100 in a first position and connects the primary return tank 112 to the system 100 in a second position. In conjunction with the primary outlet valve 122, the biased check valve 128 fluidically disconnects the primary fuel in the primary fuel feed 106 and the primary return tank 112 from the system 100, providing for the use of the pilot fuel in the primary fuel input line 124, described in more detail as follows.

During this configuration in which primary fuel is being used for combustion, a bias line 130 from the primary fuel input line 124 provides biasing pressure (outlet pressure) to the biased check valve 128 to keep open the biased check valve 128 while the primary fuel pump 120 is pumping and providing the primary fuel into the primary fuel input line 124. It should be noted that the biased check valve 128 is one example of a fluidic shutoff technology, as other technologies may be used. For example, rather than using the biased check valve 128, an actuated valve may be used, the actuated valve being open when the primary fuel pump 120 is energized and closed when the primary fuel pump 120 is deenergized, for example. Returning to FIG. 1, the system 100 further includes two bypass lines that are used to provide a fluid flow path to provide the at-cylinder fuel switching. It should be understood that the use of a bypass valve, a solenoid-activated (solenoid) valve, and the like is merely for purposes of describing an example of the presently disclosed subject matter and is not intended to limit the scope of the presently disclosed subject matter. During the configuration described above whereby the primary fuel is being pumped into the injector 102, an input valve 132 of an input bypass line 134 is maintained closed by the pressure of the primary fuel pump 120 and the primary fuel input line 124. Further, in the same configuration, an outlet bypass valve 136 of an outlet bypass line 138 is maintained closed by the pressure of the pilot excess line 118.

To switch from the configuration in which the primary fuel is being supplied to the injector 102 for combustion to the pilot fuel being supplied to the injector 102 for combustion, the primary fuel pump 120 is deenergized. When the primary fuel pump 120 is deenergized, the pressure in the bias line 130 from the primary fuel input line 124 decreases, allowing the biased check valve 128 to close, fluidically disconnecting the primary return tank 112 from the system 100. The reduction in pressure in the bias line 130 from the primary fuel input line 124 further allows the input valve 132 of the input bypass line 134 to open and the primary outlet valve 122 to close, thus fluidically connecting pilot fuel input line 116 to the primary fuel input line 124 and fluidically disconnecting the primary fuel feed 106 from the primary fuel input line 124. Further, the pressure from the primary fuel excess line 126 opens the outlet bypass valve 136 of the outlet bypass line 138. Thus, in this configuration, the primary fuel is no longer received from the primary fuel feed 106. Further, the pilot fuel is pumped into the pilot fuel input line 116 and into the injector 102 for combustion, as well as, through the input valve 132 of the input bypass line 134, through the primary fuel input line 124 and into the injector 102 for combustion. Excess pilot fuel is directed into the pilot return tank 108 through both the pilot excess line 118 and the outlet bypass valve 136 of the outlet bypass line 138, whereby the primary return tank 112 is fluidically disconnected by the closure of the biased check valve 128.

To switch back to the configuration in which the primary fuel is being supplied to the injector 102 for combustion to the pilot fuel being supplied to the injector 102 for combustion, the primary fuel pump 120 is reenergized. When the primary fuel pump 120 is reenergized, the pressure in the bias line 130 from the primary fuel input line 124 increases, allowing the biased check valve 128 to open, fluidically connecting the primary return tank 112 to the system 100. The increase in pressure in the bias line 130 from the primary fuel input line 124 further causes the input valve 132 of the input bypass line 134 to close and the primary outlet valve 122 to close, thus fluidically disconnecting pilot fuel input line 116 from the primary fuel input line 124 and fluidically connecting the primary fuel feed 106 to the primary fuel input line 124. Further, the outlet bypass valve 136 of the outlet bypass line 138 closes, returning the system to the configuration in which the primary fuel is provided to the injector 102 for combustion, illustrated in additional detail in FIG. 2.

Figure 2:
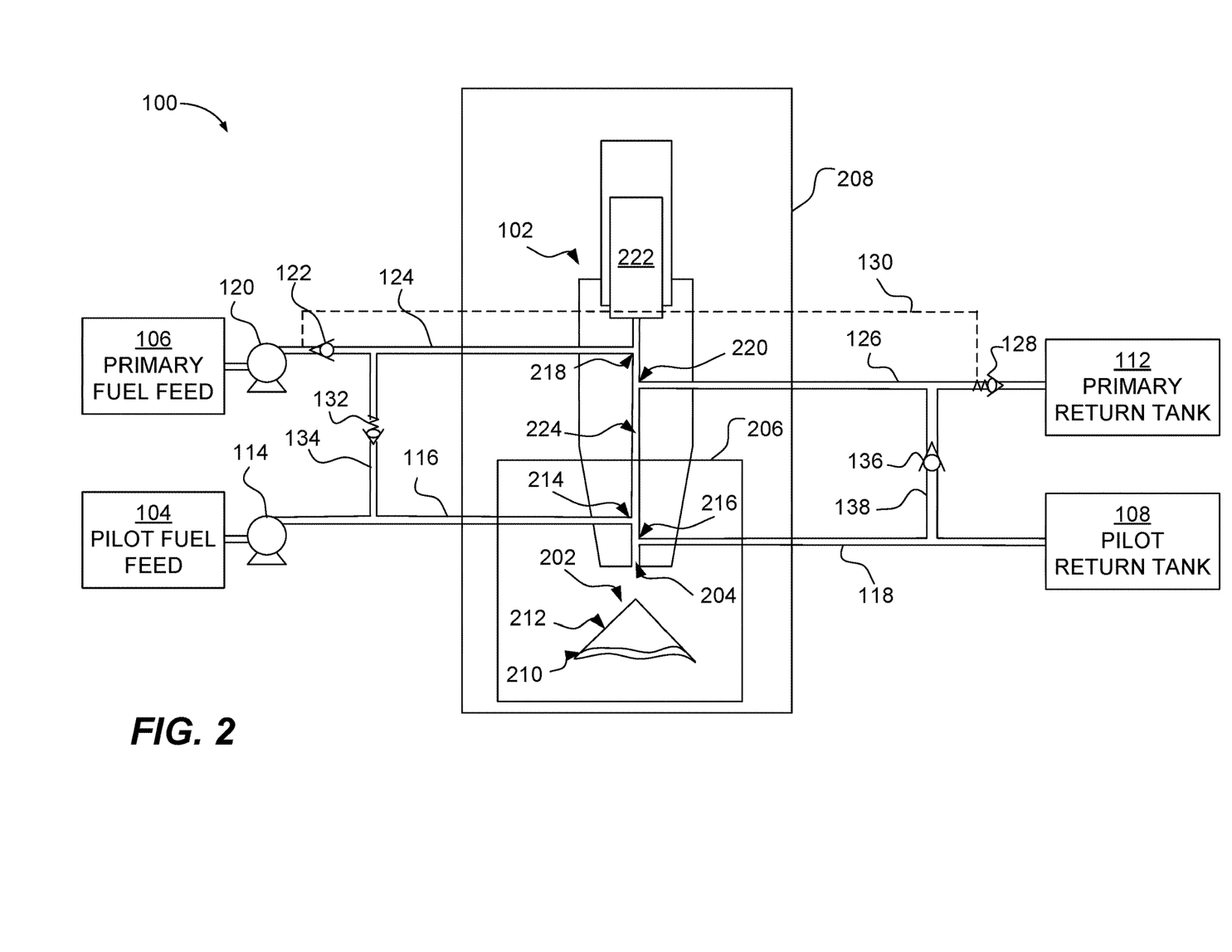
FIG. 2 is a schematic of an injector system showing the flows of a pilot fuel from a pilot fuel feed and a primary fuel from a primary fuel feed configured for at-cylinder fuel switching, in accordance with various examples of the presently disclosed subject matter.

FIG. 2 is a schematic of an injector system 200 showing the flows of the pilot fuel from the pilot fuel feed 104 and the primary fuel from the primary fuel feed 106 of the system 100 of FIG. 1 configured for at-cylinder fuel switching, in accordance with various examples of the presently disclosed subject matter. In FIG. 2, the same element number designations are used for the elements described in FIG. 1 above. It should be noted that the injector 102 as illustrated in FIG. 2 is merely to illustrate fluid flows in an at-cylinder fuel switching configuration, as the injector 102 and other components illustrated herein may have additional features, components, or structures that are not illustrated in this and other figures but may otherwise be used. Returning to FIG. 2, the injector 102 injects a fuel load 202 through an injector port 204 into a cylinder 206 of an engine 208 for combustion. It should be noted that although a single port fuel injector 102 is illustrated, the presently disclosed subject matter may be used with other types of injectors, including injectors with separate ports for the pilot fuel and the primary fuel, and are considered to be within the scope of the presently disclosed subject matter.

The fuel load 202 includes a pilot fuel 210 portion and a primary fuel 212 portion. As noted above, the pilot fuel 210 is injected first to commence the combustion process in the cylinder 206. The injector 102 includes pilot fuel inlet 214 for receiving the pilot fuel 210 from the pilot fuel input line 116 and a pilot fuel outlet 216 for removing excess pilot fuel 210 into the pilot return tank 108 through the pilot excess line 118. The injector 102 further includes a primary fuel inlet 218 for receiving a fuel, such as the primary fuel 212 or the pilot fuel 210, from the primary fuel input line 124 and a primary fuel outlet 220 for removing excess primary fuel 212 into the primary fuel excess line 126, the biased check valve 128 and into the primary return tank 112. To create the fuel load 202, the injector 102 includes a piston 222. The piston 222 is configured to create a vacuum in a first action to pull the pilot fuel 210 and the primary fuel 212 into an injection chamber 224 of the injector 102. The piston 222 then creates a pressure in a second action to push the pilot fuel 210 and the primary fuel 212 in the injection chamber 224 into the cylinder 206. In the example injector 102 illustrated in FIG. 2, the pilot fuel 210 is injected first because of the lower position (i.e., fluidically closer to the injector port 204) of the pilot fuel 210 in the chamber relative to the primary fuel 212.

To switch from the configuration in which the primary fuel 212 is being supplied to the injector 102 to the pilot fuel 210 for combustion, the primary fuel pump 120 is deenergized. When the primary fuel pump 120 is deenergized, the pressure in the bias line 130 from the primary fuel input line 124 decreases, allowing the biased check valve 128 to close, fluidically disconnecting the primary return tank 112. The reduction in pressure in the bias line 130 from the primary fuel input line 124 further allows the input valve 132 of the input bypass line 134 to open and the primary outlet valve 122 to close, thus fluidically connecting the pilot fuel input line 116 to the primary fuel input line 124 and fluidically disconnecting the primary fuel feed 106 from the primary fuel input line 124.

Pressure from the primary fuel excess line 126 opens the outlet bypass valve 136 of the outlet bypass line 138. Thus, in this configuration, the primary fuel 212 is no longer received from the primary fuel feed 106. Further, the pilot fuel 210 is pumped into the pilot fuel input line 116 and into the injector 102 for combustion, as well as, through the input valve 132 of the input bypass line 134, through the primary fuel input line 124 and into the injector 102 for combustion. Excess pilot fuel 210 is directed into the pilot return tank 108 through both the pilot excess line 118 and the outlet bypass valve 136 of the outlet bypass line 138, whereby the primary return tank 112 is fluidically disconnected by the closure of the biased check valve 128.

To switch back to the configuration in which the primary fuel 212 is being supplied to the injector 102 for combustion and the pilot fuel 210 being supplied to the injector 102 as a pilot fuel, the primary fuel pump 120 is reenergized. When the primary fuel pump 120 is reenergized, the pressure in the bias line 130 from the primary fuel input line 124 increases, causing the biased check valve 128 to open, fluidically connecting the primary return tank 112 to the system 100. The increase in pressure in the bias line 130 from the primary fuel input line 124 further causes the input valve 132 of the input bypass line 134 to close and the primary outlet valve 122 to close, thus fluidically disconnecting pilot fuel input line 116 from the primary fuel input line 124 and fluidically connecting the primary fuel feed 106 to the primary fuel input line 124. Further, the outlet bypass valve 136 of the outlet bypass line 138 closes, returning the system to the configuration in which the primary fuel 212 is provided to the injector 102 for combustion. In some configurations, fuel rails may be used to provide the pilot fuel 210 and/or the primary fuel 212 to more than one cylinder, as illustrated in FIG. 3.

Figure 3:
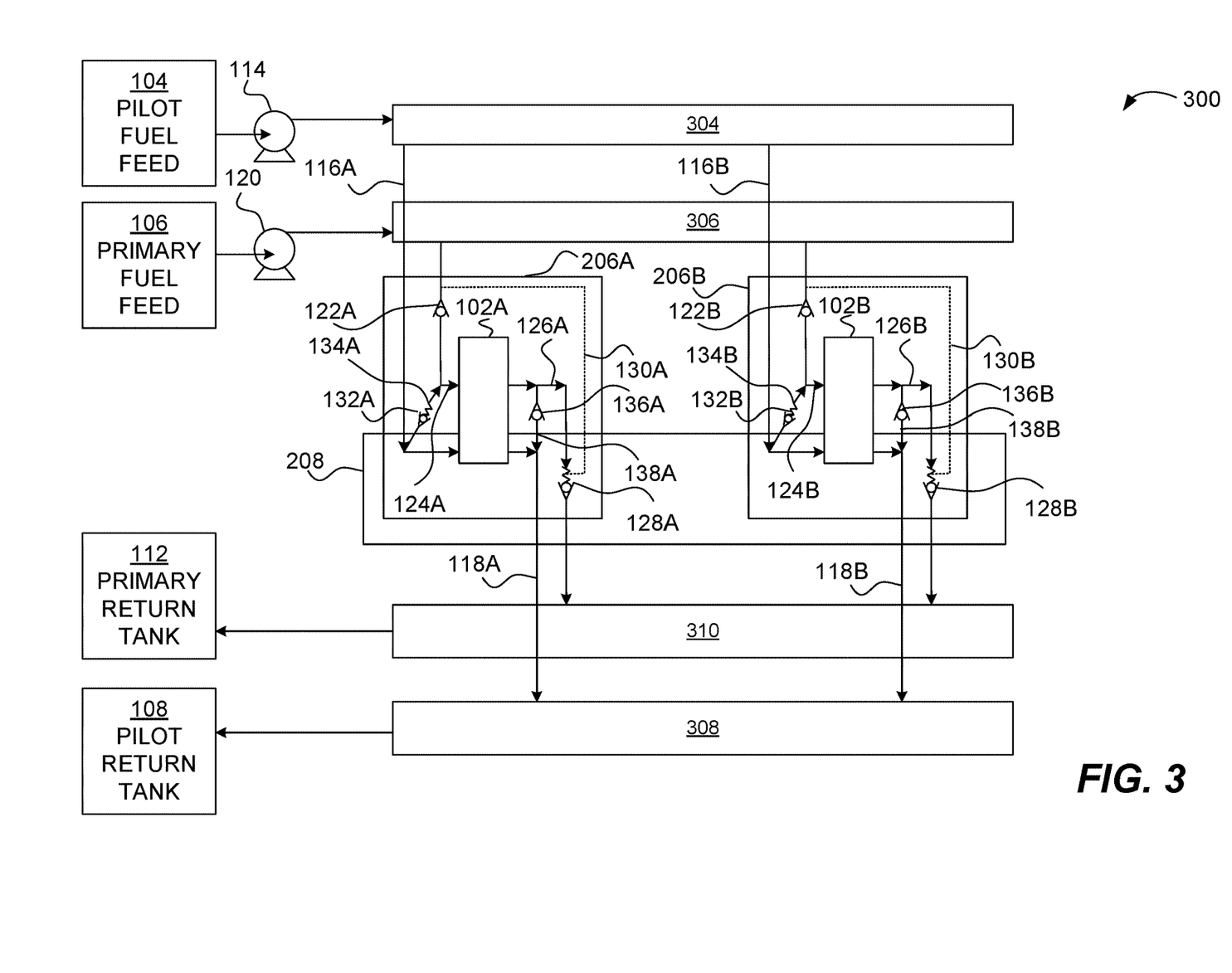
FIG. 3 is a schematic of a system configured for at-cylinder fuel switching showing multiple cylinders, in accordance with various examples of the presently disclosed subject matter.

FIG. 3 is a schematic of a system 300 configured for at-cylinder fuel switching showing multiple cylinders, in accordance with various examples of the presently disclosed subject matter. It should be noted that the same element designations are used in FIG. 3 for similarly configured elements described in FIGS. 1 and 2. The use of "A" or "B" appended to an element designation is intended to designate more than one similarly configured element described in FIGS. 1 and 2. The system 300 of FIG. 3 includes elements of the system 100 of FIG. 1 with the addition of a pilot fuel rail 304 and a primary fuel rail 306. As used herein, a "rail" is a fuel line that supplies fuel to one or more injectors, such as injectors 102A and 102B. It should be noted that the injectors 102A and 102B can be single injectors capable of receiving both the pilot fuel 210 and the primary fuel 212, multiple injectors with each capable of receiving either the pilot fuel 210 or the primary fuel 212, single port injectors as described in FIG. 2 capable of injecting both the pilot fuel 210 and the primary fuel 212 thru a single injection port, multiple port injectors with one port injecting the pilot fuel and another port injecting the primary fuel 212, and/or combinations thereof.

The pilot fuel pump 114 pumps the pilot fuel 210 into the pilot fuel rail 304. The primary fuel pump 120 pumps the primary fuel 212 into the primary fuel rail 306. Excess primary fuel 212 enters an excess primary fuel rail 310 and to the primary return tank 112. To switch from the configuration in which the primary fuel 212 is being supplied to the injectors 102A and 102B to the pilot fuel 210 for combustion, the primary fuel pump 120 is deenergized. When the primary fuel pump 120 is deenergized, the pressure in the bias lines 130A and 130B from the primary fuel input lines 124A and 124, respectively decreases. The reduction in pressure allows the biased check valves 128A and 128B to close, fluidically disconnecting the primary return tank 112 from the fuel input lines 124A and 124. The reduction in pressure in the bias lines 130A and 130B from the primary fuel input lines 124A and 124 further allows the input valves 132A and 132B of the input bypass lines 134A and 134B, respectively, to open. Further the primary outlet valves 122A and 122B close, thus fluidically connecting pilot input lines 116A and 116B to the primary fuel input lines 124A and 124 and fluidically disconnecting the primary fuel feed 106 from the primary fuel input lines 124A and 124.

Pressure from the primary fuel excess lines 126A and 126B opens the outlet bypass valves 136A and 136B of the outlet bypass lines 138A and 138B, respectively. Thus, in this configuration, the primary fuel 212 is no longer received from the primary fuel feed 106. Further, the pilot fuel 210 is pumped into the pilot input lines 116A and 116B and into the injectors 102A and 102B, respectively for combustion. Additionally, the pilot fuel 210 is pumped through the input valves 132A and 32B of the input bypass lines 134A and 134B, through the primary fuel input lines 124A and 124B and into the injectors 102A and 102B, respectively, for combustion. Excess pilot fuel 210 is directed into the pilot return tank 108 through both the pilot excess lines 118A and 118B and excess pilot fuel rail 308 and the outlet bypass valves 136A and 136B of the outlet bypass lines 138A and 138B. In this configuration, the primary return tank 112 is fluidically disconnected by the closure of the biased check valves 128A and 128B so pilot fuel is blocked from entering the primary return tank 112.

To switch back to the configuration in which the primary fuel 212 is being supplied to the injectors 102A and 102B for combustion and the pilot fuel 210 being supplied to the injectors 102A and 102B as a pilot fuel, the primary fuel pump 120 is reenergized. When the primary fuel pump 120 is reenergized, the pressure in the bias lines 130A and 130B from the primary fuel input lines 124A and 124, respectively, increases. The increase in pressure causes the biased check valves 128A and 128B to open, fluidically connecting the primary return tank 112 to the fuel input lines 124A and 124B. The increase in pressure in the bias lines 130A and 130B from the primary fuel input lines 124A and 124 further causes the input valves 132A and 132B of the input bypass lines 134A and 134B, respectively, to close. Additionally, the primary outlet valves 122A and 122B open, thus fluidically disconnecting the pilot input lines 116A and 116B from the primary fuel input lines 124A and 124 and fluidically connecting the primary fuel feed 106 to the primary fuel input lines 124A and 124.

Pressure from the primary fuel excess lines 126A and 126B cause the outlet bypass valves 136A and 136B of the outlet bypass lines 138A and 138B, respectively, to close. Thus, in this configuration, the primary fuel 212 is received from the primary fuel feed 106. Further, the pilot fuel 210 is pumped into the pilot input lines 116A and 116B and into the injectors 102A and 102B, respectively for combustion. Excess pilot fuel 210 is directed into the pilot return tank 108 through both the pilot excess lines 118A and 118B and the outlet bypass valves 136A and 136B of the outlet bypass lines 138A and 138B, whereby the primary return tank 112 is fluidically connected by the opening of the biased check valves 128A and 128B. Because the biased check valves 128A and 128B receive a pressure input from the same source, the primary fuel pump 120, it may be beneficial in some examples to use a single biased check valve rather than multiple checks valves, illustrated in more detail in FIG. 4.

Figure 4:
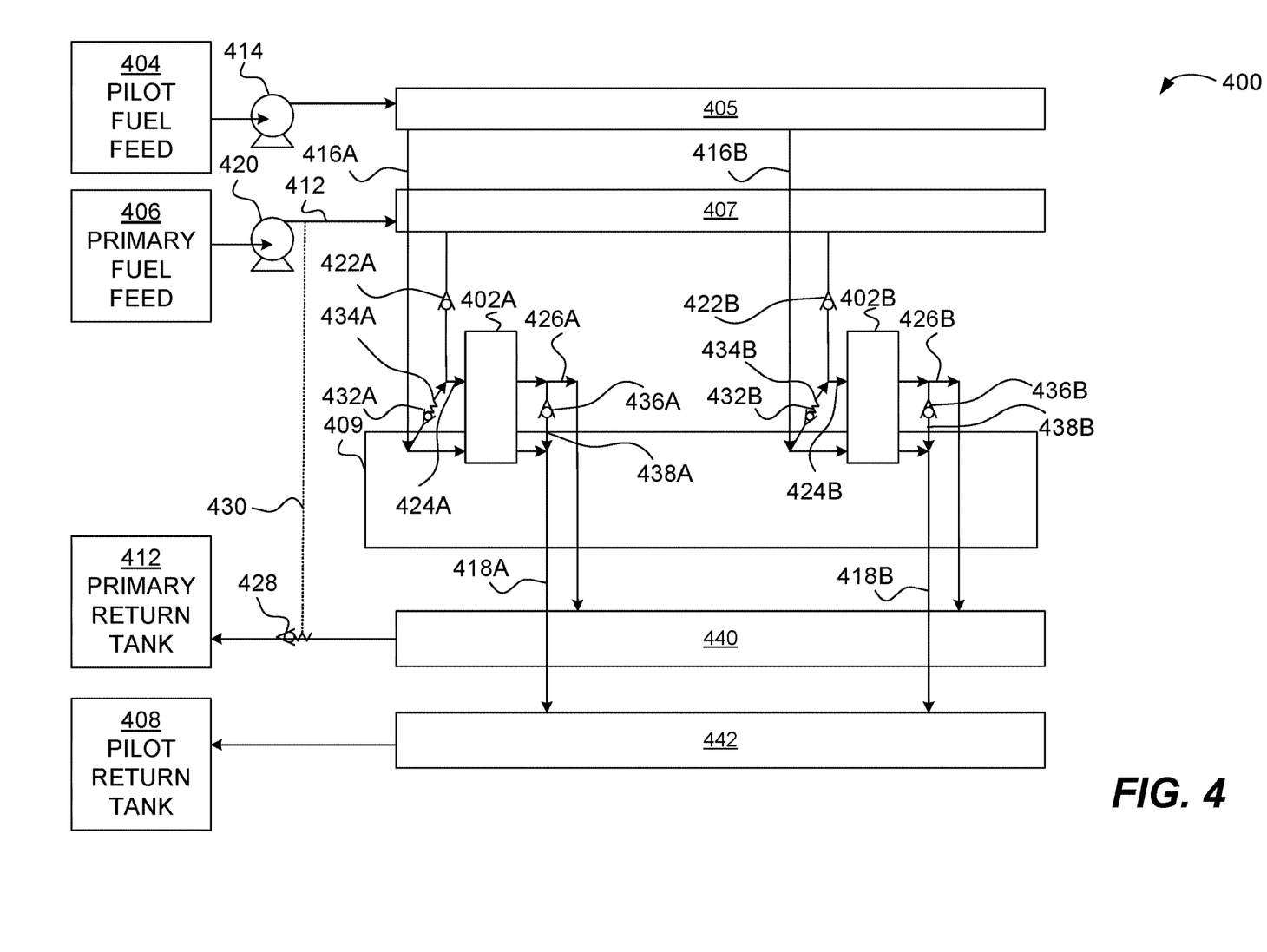
FIG. 4 is a schematic of a system configured for at-cylinder fuel switching of an engine using one biased valve for switching more than one cylinder from one fuel to another fuel, in accordance with various examples of the presently disclosed subject matter.

FIG. 4 is a schematic of a system 400 configured for at-cylinder fuel switching of an engine 409 using one biased valve for switching more than one cylinder from one fuel to another fuel, in accordance with various examples of the presently disclosed subject matter. In FIG. 4, when a primary fuel is being supplied to injectors 402A and 402B as the primary combustion fuel and a pilot fuel is used to initiate the combustion of the primary fuel, a primary fuel pump 420 is energized. When the primary fuel pump 420 is energized, the pressure in bias line 430 from the primary fuel pump 420 causes biased check valve 428, the primary return isolation valve, to open, fluidically connecting the primary return tank 412 to primary fuel excess lines 426A and 426B. Thus, rather than multiple bias lines or multiple biased check valves, illustrated by way of example in FIGS. 1-4, one bias line (430) and one biased check valve (428) are used in the system 400. In some examples, a bias check valve with an accompanying bias line may be used for a single cylinder, multiple cylinders, or all the cylinders of an engine. The presently disclosed subject matter is not limited to the number of cylinders.

In this configuration the primary fuel pump 420 pumps the primary fuel from a primary fuel feed 406 into a primary fuel rail 407. The primary fuel travels from the primary fuel rail 407 through primary outlet valves 422A and 422B, primary fuel input lines 424A and 424B, and into injectors 402A and 402B for combustion. Excess primary fuel exits the injectors 402A and 402B through primary fuel excess lines 426A and 426, into excess primary fuel rail 440) and into a primary return tank 412. Further in this configuration, a pilot fuel pump 414 pumps a pilot fuel from the pilot fuel feed 404 into a pilot fuel rail 405. The pilot fuel leaves the pilot fuel rail 405 through pilot input lines 416A and 416B and into the injectors 402A and 402B, respectively for combustion. Excess pilot fuel leaves through pilot excess lines 418A and 418B into pilot fuel excess rail 442 and into a pilot return tank 408.

To switch from the configuration in which a primary fuel is being supplied to injectors 402A and 402B as the primary combustion fuel and a pilot fuel is used to initiate the combustion of the primary fuel, the primary fuel pump 420 is deenergized, causing a pressure decrease at an outlet 421 of the primary fuel pump 420. The decrease in pressure transfers through bias line 430, causing the biased check valve 428 to close, fluidically disconnecting the primary return tank 412 from the primary fuel excess lines 426A and 426B. Thus, in this configuration, the pilot fuel is pumped by the pilot fuel pump 414 into the pilot fuel rail 405. The pilot fuel leaves the pilot fuel rail 405 and into pilot input lines 416A and 416B of the injectors 402A and 402B. The pressure of the pilot fuel in relation to the primary fuel opens input valves 432A and 432B of input bypass lines 434A and 434B and closes primary outlet valves 422A and 422B, thus fluidically connecting pilot input lines 416A and 416B to the primary fuel input lines 424A and 424B and fluidically disconnecting the primary fuel feed 406 from the primary fuel input lines 424A and 424B. Excess pilot fuel exits through pilot excess lines 418A and 418B, into the pilot fuel excess rail 442, and into the pilot return tank 408. Outlet bypass valves 436A and 436B of outlet bypass lines 438A and 438B, respectively, are maintained closed by the pressure of the pilot excess lines 418A and 418B, respectively. The closing of the biased check valve 428 prevents excess pilot fuel from exiting through the primary fuel excess lines 426A and 426B.

In various uses, it may be required or desired to remove at least a portion of a fuel, such as methanol, from parts of an engine for various reasons. For example, the fuel may be corrosive, whereby allowing the fuel to remain in contact with various parts of an engine may degrade the engine parts. In another example, the fuel may be a safety hazard that if left within the engine or the fuel delivery system of the engine can endanger personal using the engine. Thus, some engine systems include a manner in which to purge a portion of a fuel from the system, an example of which is provided in FIG. 5.

Figure 5:
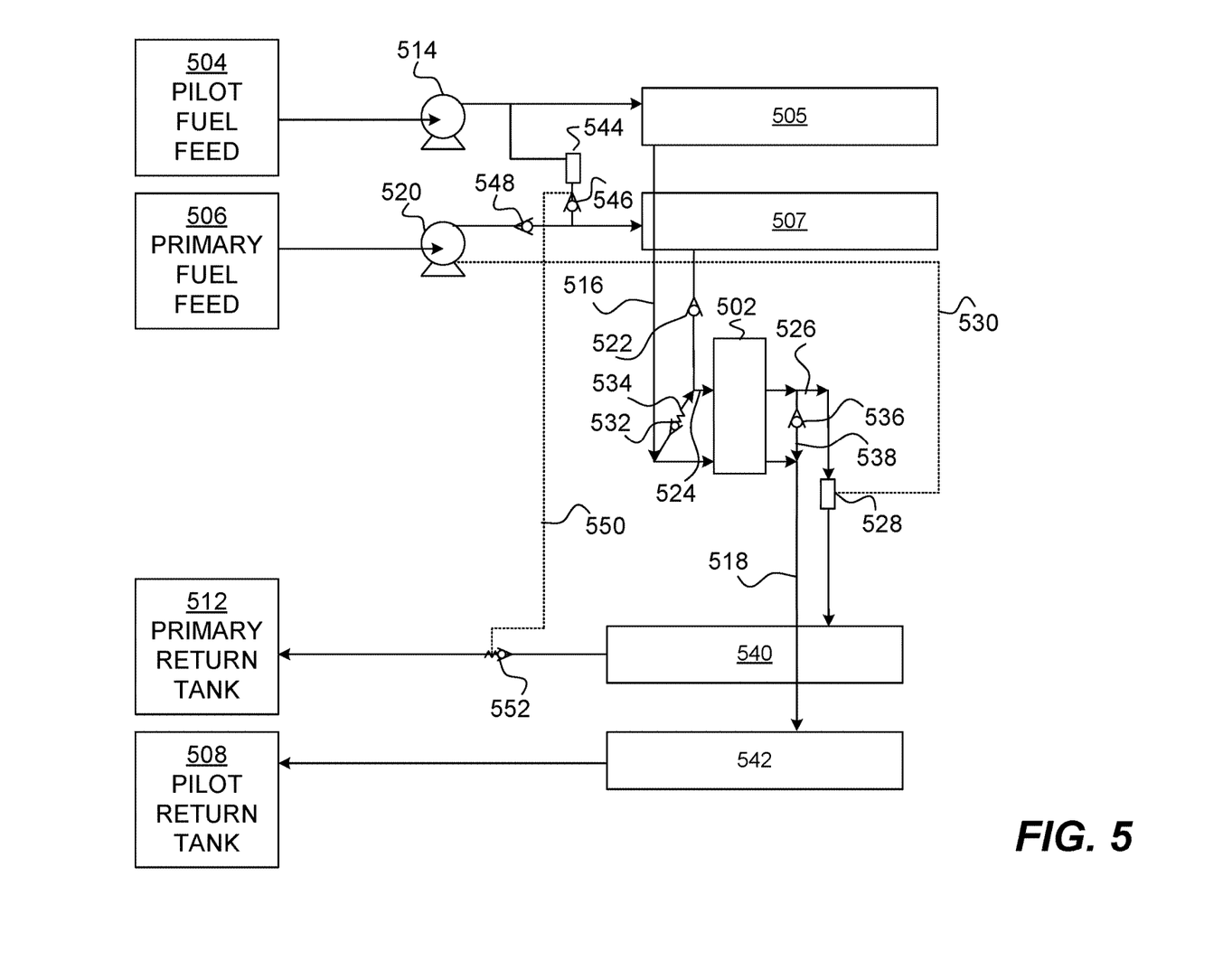
FIG. 5 is a schematic of a system configured for at-cylinder fuel switching and fuel purging, in accordance with various examples of the presently disclosed subject matter.

FIG. 5 is a schematic of a system 500 configured for at-cylinder fuel switching and fuel purging, in accordance with various examples of the presently disclosed subject matter. In FIG. 5, when a primary fuel is being supplied to injector 502 as the primary combustion fuel and a pilot fuel is used to initiate the combustion of the primary fuel, a primary fuel pump 520 is energized. To fluidically connect a primary return tank 512 to the primary fuel feed 506, a primary solenoid valve 528 is provided as a primary return isolation valve. The primary solenoid valve 528 is a normally closed solenoid valve that is opened by electrical power 530. The electrical power 530 can be tapped from electrical power provided to a primary fuel pump 520. In that manner, when the primary fuel pump 520 is energized the primary solenoid valve 528 is opened and when the primary fuel pump 520 is deenergized the primary solenoid valve 528 is closed. Thus, rather than the hydraulic action used in FIGS. 1-4 above for a biased valve, the primary return tank 512 may be fluidically connected using other technology such as the primary solenoid valve 528 of FIG. 5. Additionally, it should be noted that the electrical power 530) may be provided from other sources, as FIG. 5 is merely an example. In this configuration the primary fuel pump 520 pumps the primary fuel from the primary fuel feed 506 into a primary fuel rail 507. The primary fuel travels from the primary fuel rail 507 through primary outlet valve 522, primary fuel input line 524, and into the injector 502 for combustion. Excess primary fuel exits the injector 502 through primary fuel excess line 526, into excess primary fuel rail 540 and into a primary return tank 512. Further in this configuration, a pilot fuel pump 514 pumps a pilot fuel from the pilot fuel feed 504 into a pilot fuel rail 505. The pilot fuel leaves the pilot fuel rail 505 through pilot input line 516 and into the injector 502 for combustion as a pilot fuel. Excess pilot fuel leaves through pilot excess line 518 into pilot fuel excess rail 542 and into a pilot return tank 508.

To switch from the configuration in which a primary fuel is being supplied to the injector 502 to a configuration using a pilot fuel as the primary fuel, the primary fuel pump 520 is deenergized, deenergizing the electrical power 530 and thus closing the primary solenoid valve 528. Closing the primary solenoid valve 528 fluidically disconnects the primary return tank 512 from the primary fuel excess line 526. Further in this configuration, the pilot fuel is pumped by the pilot fuel pump 514 into the pilot fuel rail 505. The pilot fuel leaves the pilot fuel rail 505 and into pilot input line 516 of the injector 502. The pressure of the pilot fuel in relation to the primary fuel opens input valve 532 of input bypass line 534 and closes primary outlet valve 522, thus fluidically connecting pilot input line 516 to the primary fuel input line 524 and fluidically disconnecting the primary fuel feed 506 from the primary fuel input line 524. Outlet bypass valve 536 of outlet bypass line 538 is maintained closed by the pressure of a pilot excess line 518. Excess pilot fuel exits through the pilot excess line 518, into the pilot fuel excess rail 542, and into the pilot return tank 508. The closing of the primary solenoid valve 528 prevents excess pilot fuel from exiting through the primary fuel excess line 526.

As noted above, in some situations, it may be desirable or required to purge the primary fuel from some portions of a system. In this manner, the system 500 of FIG. 5 is configured to purge the primary fuel (e.g., methanol) from a portion of the system 500. In the example systems of FIGS. 1-4 above, when the biased check valve at the outlet of the primary fuel excess line is closed, for example, the biased check valve 128 of FIG. 1, the primary return tank is fluidically disconnected from the system. While done so to prevent pilot fuel from entering the primary return tank, primary fuel may remain in both the primary fuel input line 524 and the primary fuel excess line 526. To commence a purging operation of the primary fuel input line 524 and the primary fuel excess line 526, purge solenoid valve 544 is activated and opened. When opened, the pilot fuel pumped by the pilot fuel pump 514 also enters the primary fuel input line 524 through purge check valve 546. A pump purge check valve 548 prevents a flow of the pilot fuel into the primary fuel feed 506. The pump purge check valve 548 may be optional if it is desired to purge primary fuel from the primary fuel pump 520 as well. A purge bias line 550) provides fluidic pressure from the purge solenoid valve 544 to a biased purge valve 552, which opens when the purge solenoid valve 544 is activated and open. Thus, in this configuration, the pilot fuel may be used to purge the primary fuel (e.g., methanol) through the primary fuel rail 507, the primary fuel input line 524, the primary fuel excess line 526, the primary solenoid valve 528 (which is maintained open), through the excess primary fuel rail 540 and into the primary return tank 512. The purging operation may be completed by closing the purge solenoid valve 544, and the engine may be shut down.

Figure 6:
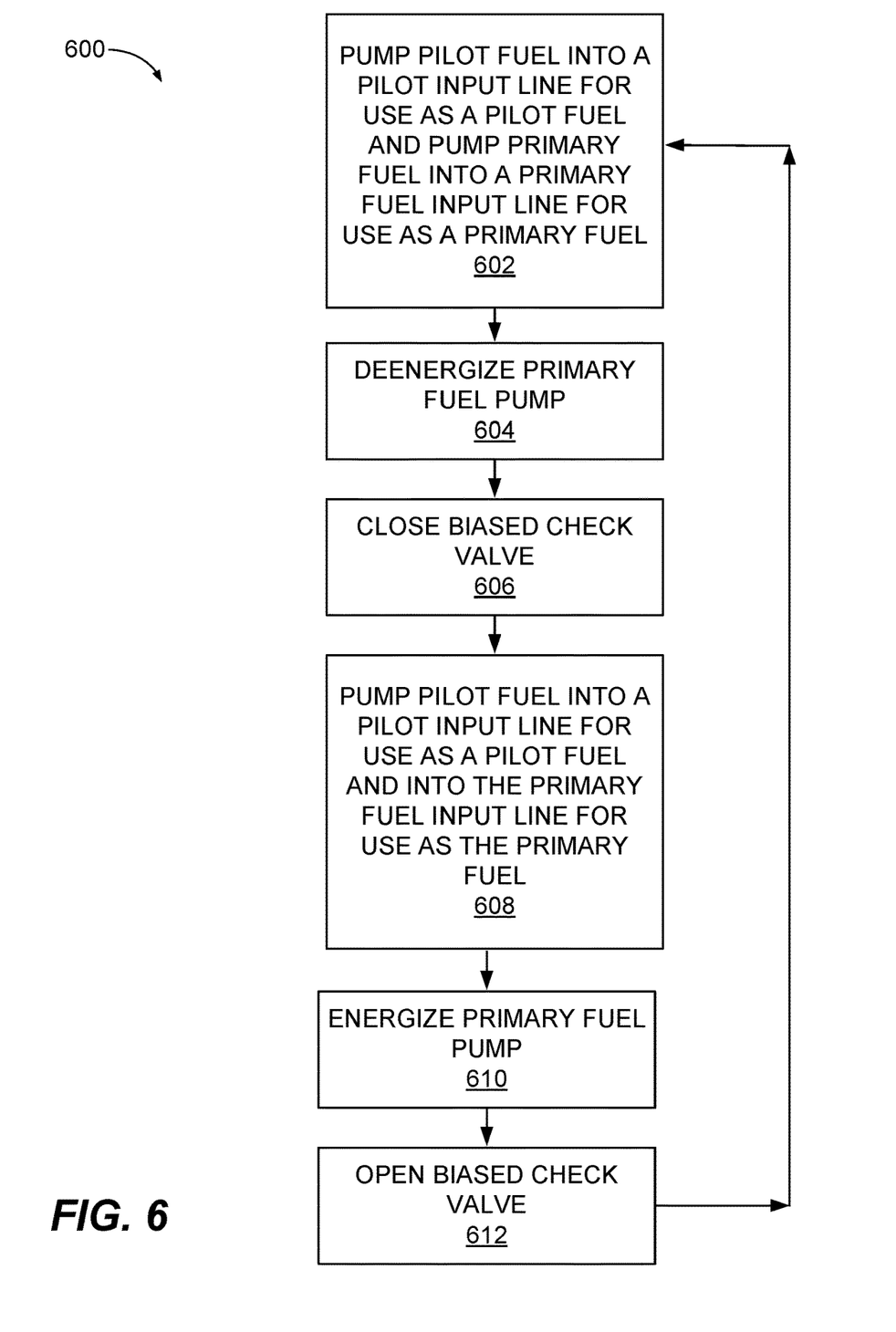
FIG. 6 illustrates a method for operating a system in which at-cylinder fuel switching may be performed, in accordance with various examples of the presently disclosed subject matter.

FIG. 6 illustrates a method 600 for operating the system 100 in which at-cylinder fuel switching may be performed, in accordance with various examples of the presently disclosed subject matter. The method 600 and other processes described herein are illustrated as example flow graphs, each operation of which may represent a sequence of operations, the order of which is not intended to be construed as a limitation, and any number of the described operations can be combined in any order and/or in parallel to implement the processes.

The method 600 commences at step 602, where the system is operating in a first configuration whereby the pilot fuel pump 114 pumps the pilot fuel through the pilot fuel input line 116 and into the injector 102 for combustion. Excess pilot fuel exits the injector 102 through the pilot excess line 118 and into the pilot return tank 108. In the same configuration, the injector 102 receives the primary fuel (e.g., methanol) from the primary fuel feed 106. The primary fuel pump 120 is in fluidic communication with the primary fuel feed 106 and pumps the primary fuel through the primary outlet valve 122, through the primary fuel input line 124 and into the injector 102 for combustion. Excess primary fuel exits the injector 102 through the primary fuel excess line 126, through the biased check valve 128 and into the primary return tank 112.

To change from the system 100 operating in the first configuration, the method 600 continues to step 604, where the primary fuel pump 120 is deenergized, which reduces or abates the flow of the primary fuel from the primary fuel feed 106.

The method continues to step 606, where the biased check valve 128 is closed to fluidically disconnect the primary return tank 112 from the pilot fuel feed 104. When the primary fuel pump 120 is energized, the bias line 130 from the primary fuel input line 124 provides biasing pressure to the biased check valve 128 to keep open the biased check valve 128. Deenergizing the primary fuel pump 120 reduces the biasing pressure to the biased check valve 128, allowing the biased check valve 128 to close. However, it should be noted that the presently disclosed subject matter is not limited to the use of a biasing pressure, as other manners for fluidically connecting and disconnecting a primary return tank from a primary fuel feed may be used. FIG. 5 provides one example in which a solenoid valve is used to fluidically connect and disconnect a primary return tank from a primary fuel feed.

With the biased check valve 128 closed at step 606, the method 600 continues to step 608, where the pilot fuel is used as the primary fuel in a second configuration. In this configuration, the reduction of pressure in the bias line 130 from the primary fuel input line 124 further allows the input valve 132 of the input bypass line 134 to open and the primary outlet valve 122 to close, thus fluidically connecting pilot fuel input line 116 to the primary fuel input line 124 and fluidically disconnecting the primary fuel feed 106 from the primary fuel input line 124. Further, the pressure from the primary fuel excess line 126 opens the outlet bypass valve 136 of the outlet bypass line 138. Thus, in this configuration, the primary fuel is no longer received from the primary fuel feed 106. Further, the pilot fuel is pumped into the pilot fuel input line 116 and into the injector 102 for combustion, as well as, through the input valve 132 of the input bypass line 134, through the primary fuel input line 124 and into the injector 102 for combustion. Excess pilot fuel is directed into the pilot return tank 108 through both the pilot excess line 118 and the outlet bypass valve 136 of the outlet bypass line 138, whereby the primary return tank 112 is fluidically disconnected by the closure of the biased check valve 128.

To return to the first configuration, the method 600 continues to step 610, wherein the primary fuel pump 120 is reenergized, which increases the flow of the primary fuel from the primary fuel feed 106.

The method 600 continues to step 612, where the biased check valve 128 is opened to fluidically connect the primary return tank 112 to the pilot fuel feed 104. When the primary fuel pump 120 is energized, the bias line 130 from the primary fuel input line 124 provides biasing pressure to the biased check valve 128 to open the biased check valve 128. The method 600 then continues to step 602 in the first configuration.

Figure 7:
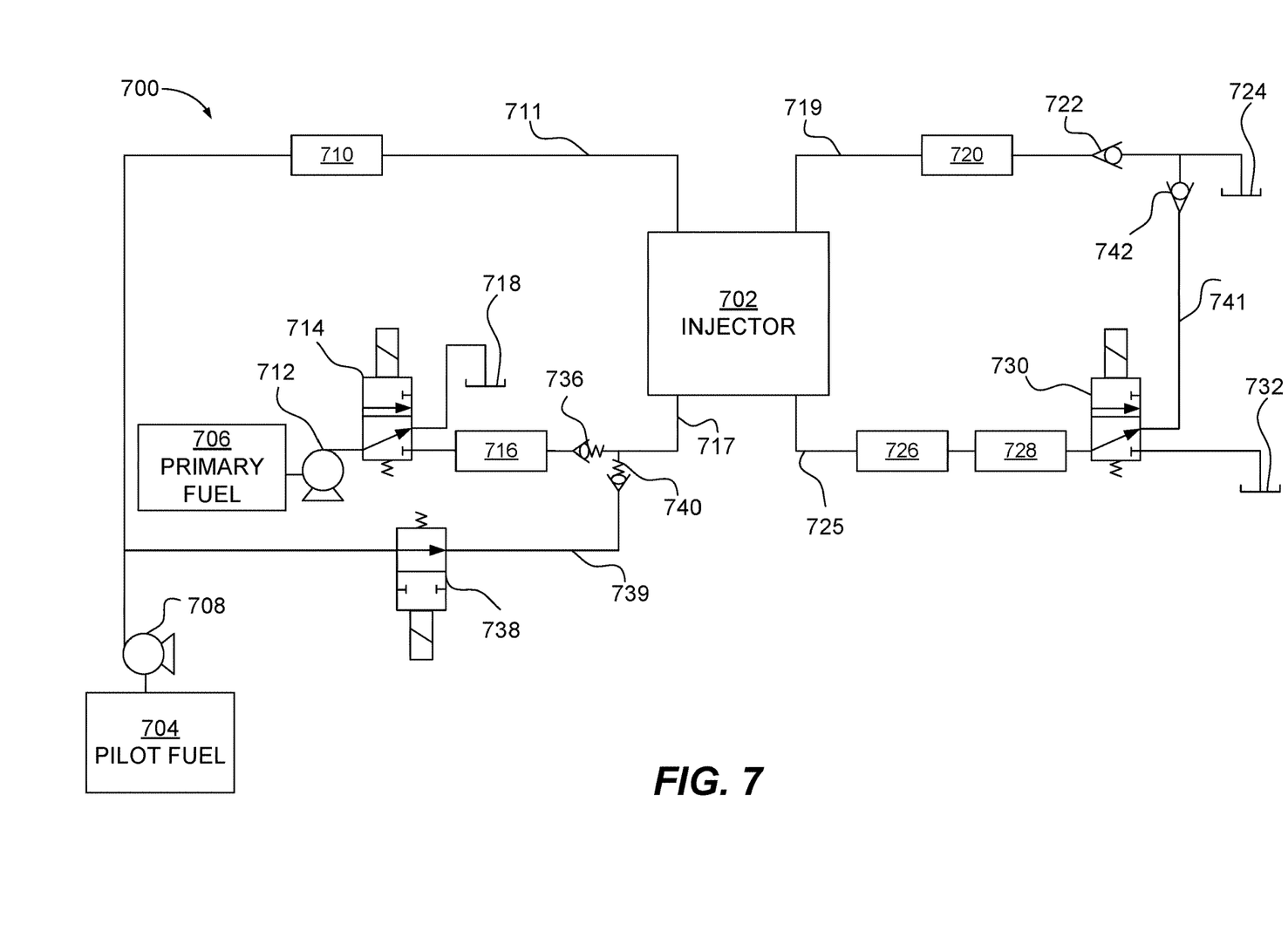
FIG. 7 is a schematic of an injector system showing the flows of a pilot fuel from a pilot fuel feed and a primary fuel from a primary fuel feed configured for at-cylinder fuel switching, in accordance with various examples of the presently disclosed subject matter.

FIG. 7 is a schematic of an alternate injector system 700 in using a secondary pilot fuel input for at-cylinder fuel switching for an injector 702, in accordance with various examples of the presently disclosed subject matter. It should be noted that the injector 702 as illustrated in FIG. 7 is merely to illustrate fluid flows in an at-cylinder fuel switching configuration, as the injector 702 and other components illustrated herein may have additional features, components, or structures that are not illustrated in this and other figures but may otherwise be used. Returning to FIG. 7, in a first configuration, the injector 702 receives pilot fuel 704 and primary fuel 706. The pilot fuel 704 is pumped by a pilot fuel pump 708 into a pilot fuel rail 710, a pilot fuel input line 711, and thereafter, into the injector 702. The primary fuel 706 is pumped by a primary fuel pump 712 through two-way primary fuel input valve 714, into primary fuel rail 716, a primary fuel input line 717, and thereafter, into the injector 702.

As mentioned above, the primary fuel input valve 714 is a two-way solenoid valve. In an energized state (e.g., in a first position), whereby the solenoid receives power, the primary fuel 706 is directed into the primary fuel rail 716. In a deenergized state, whereby the solenoid valve is not receiving power, the primary fuel 706 is directed into a primary fuel return 718. The primary fuel return 718 is a fuel line that directs the primary fuel 706 into a primary fuel tank (not shown) used to store the primary fuel 706. Continuing with the current configuration, uncombusted pilot fuel 704 exits the injector 702 through a pilot fuel excess line 719, into a pilot fuel return rail 720, through a pilot fuel return check valve 722, and thereafter, into a pilot fuel return 724. In a manner similar to the primary fuel return 718, the pilot fuel return 724 is a fuel line that directs the pilot fuel 704 into a pilot fuel tank (not shown) used to store the pilot fuel 704. Uncombusted primary fuel 706 exits the injector 702 through primary fuel excess line 725, into a primary fuel rail return 726, through a fluid mixture sensor 728, through primary return isolation valve 730, and thereafter, into a primary fuel return 732. The primary fuel return 732 is a fuel line that directs the primary fuel 706 into a primary fuel tank (not shown) used to store the primary fuel 706. The primary return isolation valve 730 is a two-way solenoid valve, whereby in an energized state (or a first position), the uncombusted primary fuel 706 is directed into the primary fuel return 732. In a deenergized state (or a second position), whereby the solenoid valve is not receiving power, the ucombusted primary fuel 706 is directed into a fuel bypass 734, used when the pilot fuel 704 is being provided as both the pilot fuel and the primary fuel, explained in more detail below:

To switch from the first configuration described above, in which the primary fuel 706 is being supplied to the injector 702, to a second configuration using a pilot fuel 704 as the primary fuel and the pilot fuel, the primary fuel pump 712 and the primary fuel input valve 714 are deenergized (e.g., in a second position). Deenergizing the primary fuel input valve 714 directs the output of the primary fuel input valve 714 from the primary fuel rail 716 to the primary fuel return 718 and causes primary outlet valve 736 to close. Along with deenergizing the primary fuel pump 712 and the primary fuel input valve 714, a pilot fuel bypass valve 738 is energized from a first position that is closed (fluidically disconnecting the pilot fuel 704) to a second position that is open, fluidically connecting the pilot fuel 704 with the primary fuel input line 717. Thus, in the second position, a portion of the pilot fuel 704 is directed through an input bypass line 739, a pilot fuel bypass check valve 740, and into the injector 702. The pilot fuel bypass check valve 740 opens with pressure from the pilot fuel pump 708 and the reduction in pressure from the primary fuel pump 712. Thus, in this configuration, the pilot fuel 704 is entering the injector 702 both thru the pilot fuel rail 710 and the pilot fuel bypass check valve 740.

Upon the changing to second configuration, there may be a portion of the primary fuel 706 still exiting the injector 702. Thus, in some examples, the switching of the primary return isolation valve 730 from delivering the primary fuel 706 to the primary fuel return 732 may be delayed. As described above in the second configuration, the pilot fuel has replaced the primary fuel in the injector 702. After a predetermined period of time, or when a sensor such as the fluid mixture sensor 728 senses that the fluid is primarily or completely the pilot fuel 704 (e.g., diesel), the primary return isolation valve 730 is energized to direct the fuel into a return bypass 741, a return bypass check valve 742, and into the pilot fuel return 724.

INDUSTRIAL APPLICABILITY

The present disclosure relates generally to internal combustion engines that use two fuels for combustion, a primary fuel such as methanol and a pilot fuel such as diesel. The systems described herein allow for switching from the methanol to the diesel as a primary fuel at the cylinder rather than at the system. In some conventional systems, switching from methanol to diesel is done by switching the fuel entering the primary fuel rail. While eventually the fuel entering the cylinders will switch from methanol to diesel, there may be a time delay in doing so, as the diesel needs to move through the system and eventually reach all the cylinders. During this transition, some cylinders may be receiving (as the primary fuel) diesel fuel, some may be receiving a mixture of diesel and methanol, and some may still be receiving methanol. This situation can complicate engine timing and delay providing a desired increase in power.

The systems described herein reduce the switchover time by switching from one fuel to another fuel at the cylinder rather than at the system. In some examples, a valve (such as by way of example valves 128 of FIG. 1, 428 of FIG. 4, and 528 of FIG. 5) at the inlet of its respective primary return tank isolates the primary return tank. Further, primary fuel pumps are deenergized, allowing input valves, e.g., 132 of FIG. 3, to open, allowing pilot fuel to enter both through the pilot fuel inlet 214 into the injector 102, but also through the primary fuel inlet 218 into the injector 102. Thus, the injector 102 switches from receiving fuel from the primary fuel feed to receiving fuel from the pilot fuel feed, potentially reducing the time needed to switch from the use of the primary fuel to the pilot fuel. This can reduce the time required to provide the engine power desired by using the pilot fuel as the primary fuel rather a fuel such as methanol.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
    an internal combustion engine that combusts a primary fuel and a pilot fuel, wherein the engine comprises an injector in a cylinder of the engine, the injector configured to inject the pilot fuel and the primary fuel for combustion;
    a primary fuel pump fluidically connectable to and disconnectable from a primary fuel feed to supply the primary fuel to the injector through a primary fuel input line;
    a pilot fuel pump fluidically connected to a pilot fuel feed to supply the pilot fuel to the injector through a pilot fuel input line;
    a primary return isolation valve for fluidically disconnecting a primary fuel excess line from a primary return tank in a first position of the primary return isolation valve and fluidically connecting the primary fuel excess line in a second position of the primary return isolation valve;
    a primary outlet valve for fluidically connecting the primary fuel to the primary fuel input line when the primary outlet valve is in a first position of the primary outlet valve and fluidically disconnecting the primary fuel from the primary fuel input line when the primary outlet valve is in a second position of the primary outlet valve; and an input bypass line for providing a portion of the pilot fuel from the pilot fuel pump into the primary fuel input line when the primary outlet valve is in the second position of the primary outlet valve.

2. The system of claim 1, wherein a first position of a bypass valve fluidically disconnects the pilot fuel from the primary fuel input line, a second position of the bypass valve fluidically connects the pilot fuel with the primary fuel input line through the input bypass line and a pilot fuel bypass valve, and wherein the bypass valve is in the first position of the bypass valve when the primary outlet valve is in the first position of the primary outlet valve and in the second position of the bypass valve when the primary outlet valve is in the second position of the primary outlet valve.

3. The system of claim 1, wherein the input bypass line comprises an input valve to fluidically disconnect the pilot fuel feed from the primary fuel feed when the primary fuel pump is energized and pumping the primary fuel from the primary fuel feed.

4. The system of claim 1, wherein the primary return isolation valve comprises a biased check valve held open by an outlet pressure of the primary fuel pump when the primary fuel pump is energized and pumping the primary fuel from the primary fuel feed and closes when the primary fuel pump is deenergized and not pumping the primary fuel from the primary fuel feed.

5. The system of claim 1, wherein the primary return isolation valve comprises a normally closed, solenoid-activated valve powered by electrical power that, when the primary return isolation valve is open, fluidically connects the primary return tank to the primary fuel excess line and, when the primary return isolation valve is closed, fluidically disconnects the primary return tank from the primary fuel excess line.

6. The system of claim 5, wherein the electrical power is a portion of electrical power provided to the primary fuel pump whereby when the primary fuel pump is deenergized, the electrical power to the primary return isolation valve is removed, causing the primary return isolation valve to close.

7. The system of claim 1, further comprising an outlet bypass line and an outlet bypass valve, wherein when the outlet bypass valve is open, the primary fuel excess line is fluidically connected to a pilot return tank and when the outlet bypass valve is closed, the primary fuel excess line is fluidically disconnected from the pilot return tank.

8. The system of claim 1, wherein the pilot fuel comprises diesel and the primary fuel comprises methanol.

9. The system of claim 1, further comprising a purge valve configured, when open, to fluidically connect the pilot fuel pump to a primary fuel rail that receives a fuel for the primary fuel input line.

10. An injector system, comprising:
an injector comprising:
a pilot fuel inlet for receiving a pilot fuel from a pilot fuel pump through a pilot fuel input line from a pilot fuel pump fluidically connected to a pilot fuel feed;
a pilot fuel outlet for removing an excess of the pilot fuel into a pilot return tank;
a primary fuel inlet for receiving a fuel through a primary fuel input line, wherein the fuel comprises:
a primary fuel from a primary fuel pump when a primary outlet valve fluidically connecting a primary fuel pump to the primary fuel input line is open, and, when an input valve of an input bypass line for providing a portion of the pilot fuel from a pilot fuel pump into the primary fuel input line is closed; or
a pilot fuel from the pilot fuel pump when the primary outlet valve is closed, and, when the input valve is open; and
a primary fuel outlet for removing an excess of the fuel received into the primary fuel input line through a primary fuel excess line.

11. The injector system of claim 10, further comprising a primary return isolation valve for fluidically disconnecting the primary fuel excess line from a primary return tank when the primary return isolation valve is closed.

12. The injector system of claim 11, wherein the primary return isolation valve comprises a biased check valve held open by an outlet pressure of the primary fuel pump when the primary fuel pump is energized and pumping the primary fuel from a primary fuel feed and closes when the primary fuel pump is deenergized and not pumping the primary fuel from the primary fuel feed.

13. The injector system of claim 11, wherein the primary return isolation valve comprises a normally closed, solenoid-activated valve powered by electrical power that, when the primary return isolation valve is open, fluidically connects the primary return tank to the primary fuel excess line and, when the primary return isolation valve is closed, fluidically disconnects the primary return tank from the primary fuel excess line.

14. The injector system of claim 13, wherein the electrical power is a portion of electrical power provided to the primary fuel pump whereby when the primary fuel pump is deenergized, the electrical power to the primary return isolation valve is removed, causing the primary return isolation valve to close.

15. The injector system of claim 10, further comprising an outlet bypass line and an outlet bypass valve, wherein when the outlet bypass valve is open, the primary fuel excess line is fluidically connected to a pilot return tank and when the outlet bypass valve is closed, the primary fuel excess line is fluidically disconnected from the pilot return tank.

16. The injector system of claim 10, wherein the pilot fuel comprises diesel and the primary fuel comprises methanol.

17. A method for at-cylinder switching between methanol to diesel as a primary fuel, the method comprising:
providing a primary fuel from a primary fuel pump into a primary fuel input line through a primary fuel input valve when the primary fuel input valve is in a first position of the primary fuel input valve;
providing a pilot fuel from a pilot fuel pump into a pilot fuel input line;
deenergizing the primary fuel pump to stop a flow of the primary fuel into the primary fuel input line;
positioning the primary fuel input valve in a second position of the primary fuel input valve to direct the flow of the primary fuel to a primary fuel tank; and
positioning a bypass valve in a second position of the bypass valve to direct a portion of the pilot fuel from the pilot fuel pump, into an input bypass line, and then into the primary fuel input line.

18. The method of claim 17, further comprising changing a position of a primary return isolation valve from delivering a fluid to a primary fuel return to delivering a fluid to a pilot fuel return.

19. The method of claim 18, wherein the primary return isolation valve comprises a two-way solenoid valve.

20. The method of claim 18, wherein the primary return isolation valve comprises a biased check valve held open by an outlet pressure of the primary fuel pump when the primary fuel pump is energized and pumping the primary fuel from a primary fuel feed and closes when the primary fuel pump is deenergized and not pumping the primary fuel from the primary fuel feed.

\* \* \* \* \*